(12) United States Patent
Fast et al.

(10) Patent No.: US 11,086,281 B2
(45) Date of Patent: Aug. 10, 2021

(54) METHOD AND APPARATUS FOR ONLINE SIMULATION OF COMPLEX MOTION SYSTEMS

(71) Applicant: Rockwell Automation Technologies, Inc., Mayfield Heights, OH (US)

(72) Inventors: Brian Fast, Kirtland, OH (US); Robert Guenther, Linden (DE); Joachim Thomsen, Krefeld (DE); Robert J. Miklosovic, Chardon, OH (US); Mark A. Chaffee, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 238 days.

(21) Appl. No.: 15/812,565

(22) Filed: Nov. 14, 2017

(65) Prior Publication Data

US 2019/0146434 A1   May 16, 2019

(51) Int. Cl.
*G05B 17/02* (2006.01)
*G05B 19/402* (2006.01)
*G05B 19/05* (2006.01)

(52) U.S. Cl.
CPC .............. *G05B 17/02* (2013.01); *G05B 19/05* (2013.01); *G05B 19/402* (2013.01);
(Continued)

(58) Field of Classification Search
CPC ...... G05B 17/02; G05B 19/05; G05B 19/402; G05B 2219/23446; G05B 2219/41064; G05B 2219/23456
See application file for complete search history.

(56) References Cited

U.S. PATENT DOCUMENTS 4,808,899 A * 2/1989 Swope ................ G05B 19/351
                                                318/619
2009/0085507 A1* 4/2009 Quan ................. B41F 13/0045
                                                318/601
(Continued)

FOREIGN PATENT DOCUMENTS

EP    1313207 A1    5/2003
EP    2157489 A2    2/2010
(Continued)

OTHER PUBLICATIONS

Extended European Search Report dated Jun. 3, 2019; Application No. 18205689.5—(15) pages.
(Continued)

*Primary Examiner* — James J Lee
*Assistant Examiner* — Shon G Foley
(74) *Attorney, Agent, or Firm* — Boyle Fredrickson, SC

(57) ABSTRACT

A system and method for online simulation of a controlled machine or process utilizes a simplified model of the system dynamics and may be used with hardware in the loop to evaluate performance of the controlled system or with software in the loop to perform commissioning of the control program prior to completion of the mechanical installation. The simplified model includes dominant order dynamics of the controlled system such as the inertia of the system and a damping factor. Further, the online simulation is scheduled to execute at an update rate slower than the update rate of the control loops within the motor drive. The simplified model and reduced update rate reduce the computational burden on the processor such that the simulation may be performed either on the industrial controller or on the motor drive.

20 Claims, 6 Drawing Sheets

(52) U.S. Cl.
CPC ............ *G05B 2219/23446* (2013.01); *G05B 2219/23456* (2013.01); *G05B 2219/41064* (2013.01)

(56) References Cited

U.S. PATENT DOCUMENTS

| | | | |
|---|---|---|---|
| 2010/0039120 A1* | 2/2010 | Plude | G05B 17/02 324/555 |
| 2013/0221885 A1* | 8/2013 | Hunter | H02P 6/34 318/400.15 |
| 2019/0123676 A1* | 4/2019 | Yi | B60L 50/50 |

FOREIGN PATENT DOCUMENTS

| | | |
|---|---|---|
| EP | 3139482 A2 | 3/2017 |
| EP | 3139491 A2 | 3/2017 |
| EP | 3220216 A1 | 9/2017 |

OTHER PUBLICATIONS

Partial Extended European Search Report dated Mar. 29, 2019; Application No. 18205689.5—(16) pages.

* cited by examiner

METHOD AND APPARATUS FOR ONLINE SIMULATION OF COMPLEX MOTION SYSTEMS

BACKGROUND OF THE INVENTION

The subject matter disclosed herein relates generally to a method of simulating operation of a motion system and, more specifically, to a method for providing a dominant order, online simulation of complex motion systems.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The motor drive includes power electronic switching devices, such as insulated gate bipolar transistors (IGBTs), thyristors, or silicon controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus or a desired motor voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude and/or frequency of the output voltage is varied. The motor controller utilizes modulation techniques such as pulse width modulation (PWM) to control the switching and to synthesize waveforms having desired amplitudes and frequencies.

In certain applications, the command signal for the motor drive may be generated by an industrial controller, such as a programmable logic controller (PLC) or a programmable automation controller (PAC). The industrial controller is configured to execute a control program to control operation of an industrial machine or process. Further, the industrial machine or process may include multiple motors and multiple motor drives to control the motors. The industrial controller receives feedback signals from sensors on the controlled machine or process corresponding to the present operating state and generates output signals with the control program to actuators and to the motor drives as a function of the feedback signals to achieve a desired operation of the controlled machine or process.

As is understood, the motors are often coupled to the controlled machine or process via a drive train. The drive train may include, for example, a gearbox, a drive shaft, a lead screw, a drive belt, or a combination thereof as well as mechanical couplings between components in the drive train. The dynamics of the controlled system may become very complex due, for example, to motor dynamics, load dynamics, flexible couplings, backlash, and the like. Further, variations between similar machines or processes may exist in the dynamics of the controlled system due, for example, to manufacturing and/or installation tolerances. As a result of the complex dynamics, models generated to predict or analyze performance of the controlled machine or process become similarly complex. Determination of an accurate model may require an equal or greater level of time and skill than is required for designing the industrial controller and associated control system for the machine or process. Further, analysis of the model typically requires a dedicated computing device and offline processing.

Thus, it would be desirable to provide a simplified model of the controlled system for online simulation of the controlled machine or process.

Commissioning of the controlled machine or process includes additional challenges. The control program for the industrial controller is typically custom for each machine or process. Validation of the control program requires the motors and motor drives to be installed and connected to the industrial controlled. Validation of the control program often further requires the motors to be connected to the drive train to observe the dynamic performance of the motor drive in response to the control program. Validation of the control program is, therefore, often performed in incremental steps as different elements of the controlled machine or process are connected to the industrial controller. Portions of the validation must be deferred until after the mechanical installation is complete. As a result, changes to the control program and/or optimization of the performance of the controlled machine or process cannot be performed until the end of the commissioning process. Correcting errors in the control program or making revisions to improve performance can delay completion of the commissioning process.

Thus, it would be desirable to provide a system and method to perform commissioning of the control program prior to completion of the mechanical installation.

BRIEF DESCRIPTION OF THE INVENTION

The subject matter disclosed herein provides a system and method for online simulation of a controlled machine or process. The online simulation utilizes a simplified model of the system dynamics and may be used with hardware in the loop to evaluate performance of the controlled system, with software in the loop to perform commissioning of the control program prior to completion of the mechanical installation, or a combination thereof. The simplified model includes dominant order dynamics of the controlled system. The model includes the reflected inertia of the system, a time-varying damping factor, and a position based coefficient as the dominant factors of the system dynamics. Further, the configuration of the online simulation provides the ability to execute at an update rate slower than the update rate of the control loops within the motor drive. The simplified model and reduced update rate reduce the computational such that the simulation may be performed in the industrial controller while it is executing a control program or in a motor drive while the drive is controlling operation of a motor connected to the motor drive.

According to one embodiment of the invention, a method for simulating an axis of motion in an industrial controller is disclosed. A first reference signal, corresponding to a desired operation of the axis of motion, is generated with an axis controller, and the first reference signal is transmitted from the axis controller to a control module, where the control module corresponds to a motor drive and receives the first reference signal as an input. A second reference signal is generated with the control module as an output from at least one control loop. The second reference signal is received as an input to a simulation module, and either an estimated velocity or an estimated position of a motor controlled by the motor drive is determined with the simulation module. The simulation module includes a dynamic gain which varies as a function of the estimated velocity of the motor.

According to another embodiment of the invention, a system for simulating an axis of motion in an industrial controller is disclosed. The system includes a processor module, an axis controller, a control module, and a simulation module. The processor module is operative to execute a control program to control operation of a controlled machine or process. The axis controller is operative to generate a first reference signal corresponding to a desired operation of the axis of motion. The control module is in communication with the axis controller and corresponds to a motor drive. The control module is operative to receive the first reference signal from the axis controller and to generate a second reference signal as a function of the first reference signal. The simulation module is operative to determine at least one of an estimated velocity and an estimated position of a motor controlled by the motor drive. The simulation module includes a dynamic gain which varies as a function of the estimated velocity of the motor.

According to one aspect of the invention, the axis controller, the control module, and the simulation module may be executed by the processor module. According to another aspect of the invention, at least one of the axis controller, the control module, and the simulation module maybe executed by the motor drive.

According to still another embodiment of the invention, a method for simulating an axis of motion in an industrial controller is disclosed. A first reference signal, corresponding to a desired operation of the axis of motion, is generated with an axis controller and is transmitted from the axis controller to a control module. The control module corresponds to a motor drive, and the control module receives the first reference signal as an input. A second reference signal is generated with the control module as an output from at least one control loop. The second reference signal is received as an input to a simulation module, and at least one of an estimated velocity and an estimated position of a motor controlled by the motor drive is determined with the simulation module. The first reference signal is generated at a first periodic interval, the second reference signal is generated at a second periodic interval, and the second periodic interval is longer than the first periodic interval.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
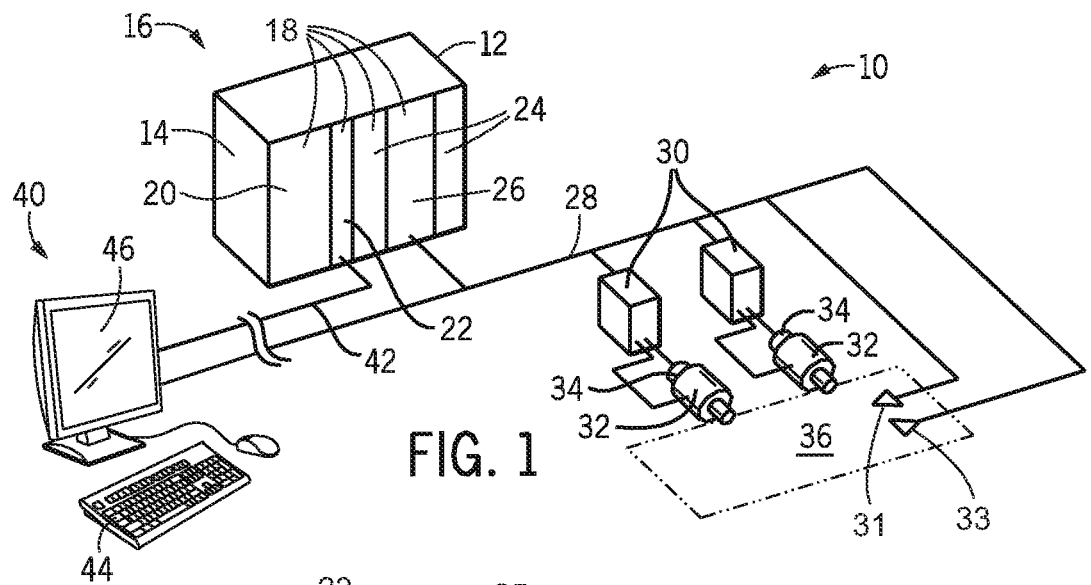
FIG. 1 is an exemplary industrial control system in which embodiments of the present invention are incorporated.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Referring initially to FIG. 1, an industrial control system 10 may include an industrial controller 12 providing, generally, a housing 14 and a bus 16 providing communication between multiple modules 18 installed in the housing 14. The modules may include, for example, a power supply module 20, a processor module 22, one or more I/O modules 24, and a network module 26. The network module 26, processor module 18, or a combination thereof may communicate on an industrial control network 28, such as ControlNet®, DeviceNet®, or EtherNet/IP®, between the industrial controller 12 and other devices connected to the industrial controller. The industrial controller 12 may be, for example, a programmable logic controller (PLC), a programmable automation controller (PAC), or the like. It is contemplated that the industrial controller 12 may include still other modules, such as an axis control module, or additional racks connected via the industrial control network 28. Optionally, the industrial controller 12 may have a fixed configuration, for example, with a predefined number of network and I/O connections.

The industrial control network 28 may join the industrial controller 12 to remote I/O modules (not shown) and one or more remote motor drives 30, the latter of which may communicate with corresponding electric motors 32 and position sensors 34 to provide for controlled motion of the electric motors 32. The controlled motion of the electric motors, in turn, controls associated industrial machinery or processes 36. Each motor drive and motor is sometimes referred to as an axis of motion. Optionally, an axis of motion may require multiple motors controlled by a single motor drive or multiple motor drives and multiple motors operating in tandem. The network 28 may also join with other devices 31 in the controlled machine or process 36, including, for example, actuators 31, which may be controlled by output signals from the industrial controller 12, or sensors 33, which may provide input signals to the industrial controller.

A configuration computer 40 may communicate with the industrial controller 12 and/or the motor drives 30 over the industrial control network 28 or via a dedicated communication channel 42, for example, connecting with the processor module 22. The configuration computer 40 may be a standard desktop or laptop computer and include a keyboard 44, display screen 46, and the like to permit the entry and display of data and the operation of a configuration program by a human operator.

Figure 2:
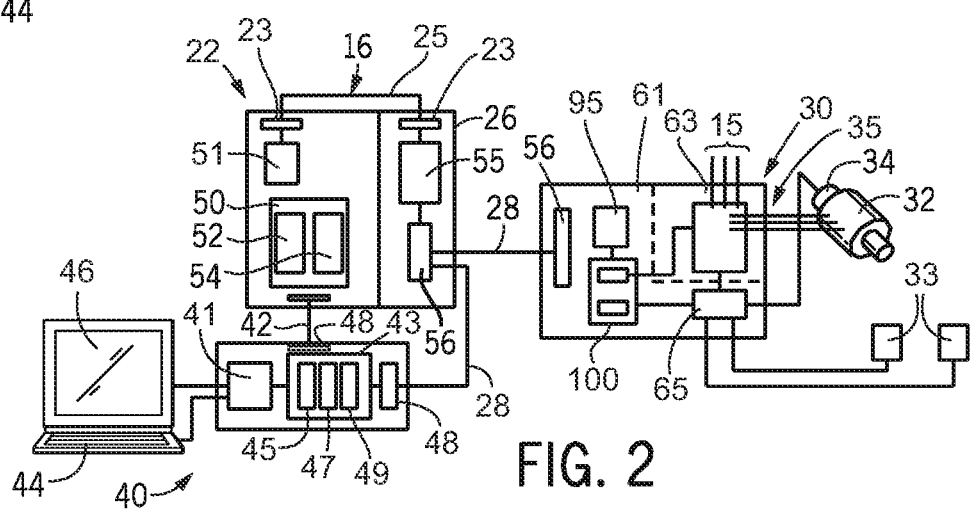
FIG. 2 is a partial block diagram representation of the exemplary industrial control system of FIG. 1

Referring next to FIG. 2, the processor module 22 may include a processor 51 communicating with a stored memory 50 to execute an operating system program 52, generally controlling the operation of the processor module 22, and a control program 54, describing a desired control of the industrial machine or process 36, where each control program 54 is typically unique to a given application of the industrial control system 10. The memory 50 may also include data tables, for example, I/O tables and service routines (not shown in FIG. 2) as used by the control program 54.

The processor module 22 may communicate via the bus 16, which may be implemented as a backplane 25 extending between backplane connectors 23, with the network module 26 or any of the other modules 18 in the industrial controller 12. The network module 26 includes a control circuit 55, which may include a microprocessor and a program stored in memory and/or dedicated control circuitry such as an application specific integrated circuit (ASIC) or field programmable gate array (FPGA). The control circuit 55 may communicate with a network interface circuit 56 within the network module 26, where the network interface circuit 56 provides for execution of low-level electrical protocols on the industrial control network 28. Similar network interface circuits 56 may be provided on other devices, such as the motor drives 30, to provide communication between devices.

As noted above, the configuration computer 40 may be a standard desktop computer having a processor 41 communicating with a memory 43, the latter holding an operating system program 45 as well as various data structures 47 and programs 49. One such program 49 may be used to configure the industrial control system 10. The configuration computer 40 may also provide for interface circuits 48 communicating between the processor 41, for example, and the industrial network 28 or a separate communication channel 42 to the processor module 22, as well as with the screen 46 and keyboard 44 according to methods understood in the art.

Figure 3:
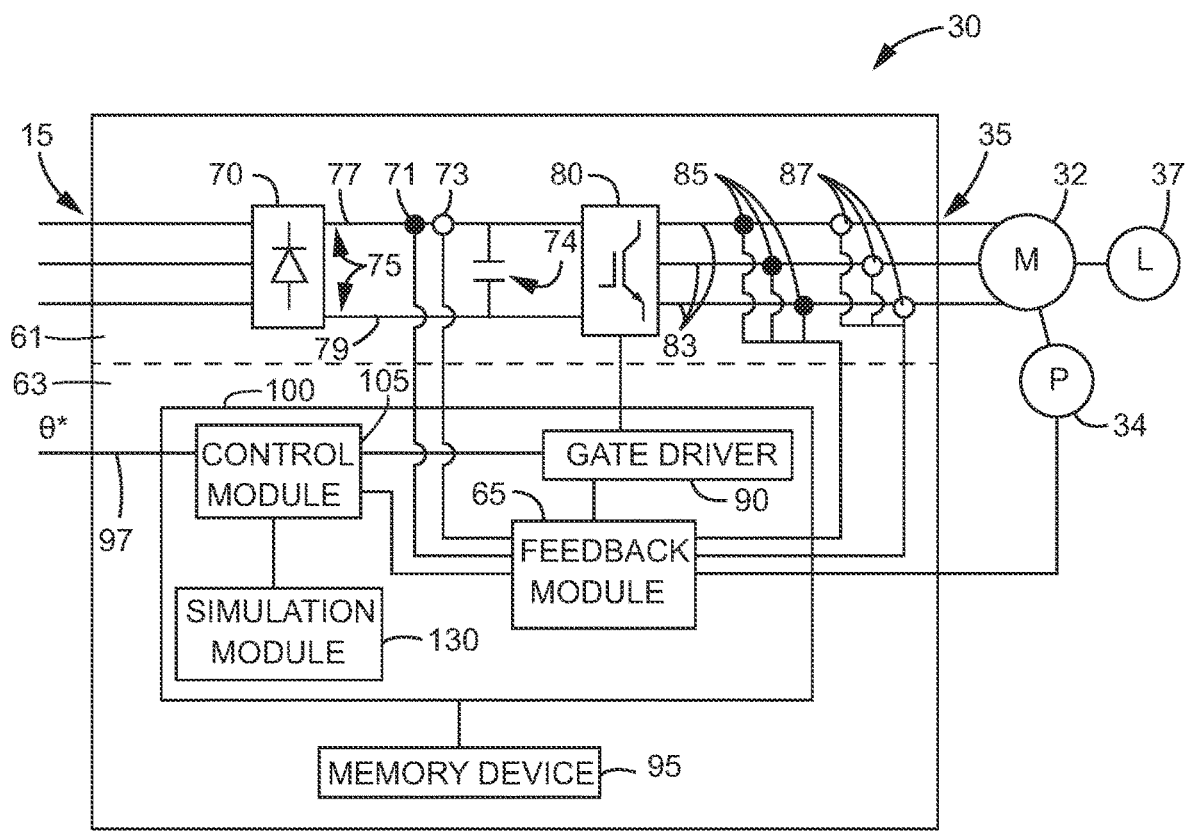
FIG. 3 is a block diagram representation of the motor drive of FIG. 1 incorporating one embodiment of the present invention.

Turning next to FIG. 3, a motor drive 30, according to one embodiment of the invention, includes a power section 61 and a control section 63. The power section 61 includes components typically handling, for example, 200-575 VAC or 200-800 VDC, and the power section 61 receives power in one form and utilizes power switching devices to regulate power output to the motor 32 in a controlled manner to achieve desired operation of the motor 32. The control section 63 includes components typically handling, for example 110 VAC or 3.3-48 VDC and, the control section 63 includes processing devices, feedback circuits, and supporting logic circuits to receive feedback signals and generate control signals within the motor drive 30.

Figure 4:
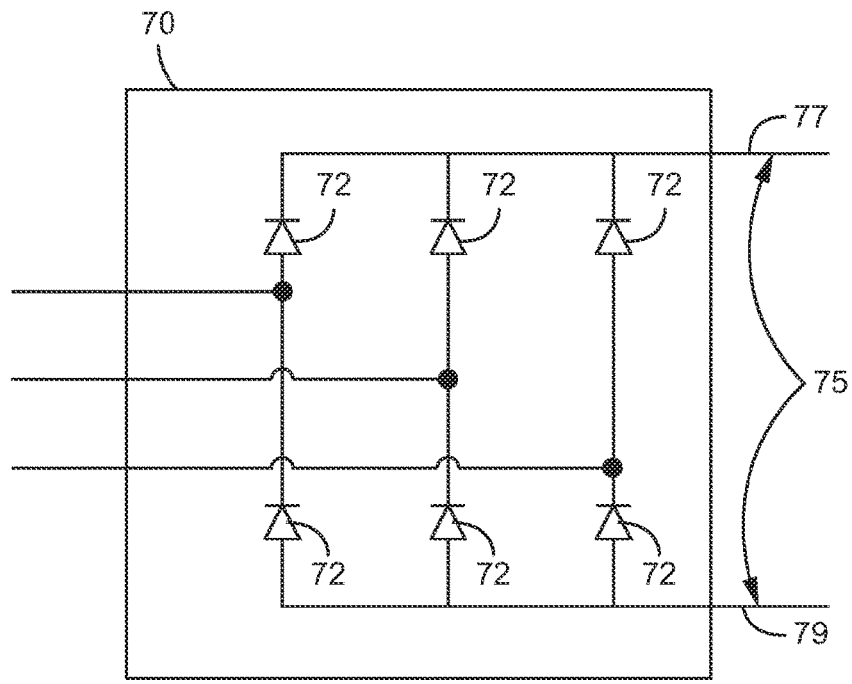
FIG. 4 is a block diagram representation of a rectifier section from the motor drive of FIG. 3.

According to the illustrated embodiment, the motor drive 30 is configured to receive a three-phase AC voltage at an input 15 of the motor drive 30 which is, in turn, provided to a rectifier section 70 of the motor drive 30. The rectifier section 70 may include any electronic device suitable for passive or active rectification as is understood in the art. With reference also to FIG. 4, the illustrated rectifier section 70 includes a set of diodes 72 forming a diode bridge that rectifies the three-phase AC voltage to a DC voltage on the DC bus 75. Optionally, the rectifier section 70 may include other solid-state devices including, but not limited to, thyristors, silicon controlled rectifiers (SCRs), or transistors to convert the input power 15 to a DC voltage for the DC bus 75. The DC voltage is present between a positive rail 77 and a negative rail 79 of the DC bus 75. A DC bus capacitor 74 is connected between the positive and negative rails, 77 and 79, to reduce the magnitude of the ripple voltage resulting from converting the AC voltage to a DC voltage. It is understood that the DC bus capacitor 74 may be a single capacitor or multiple capacitors connected in parallel, in series, or a combination thereof. The magnitude of the DC voltage between the negative and positive rails, 79 and 77, is generally equal to the magnitude of the peak of the AC input voltage.

Figure 5:
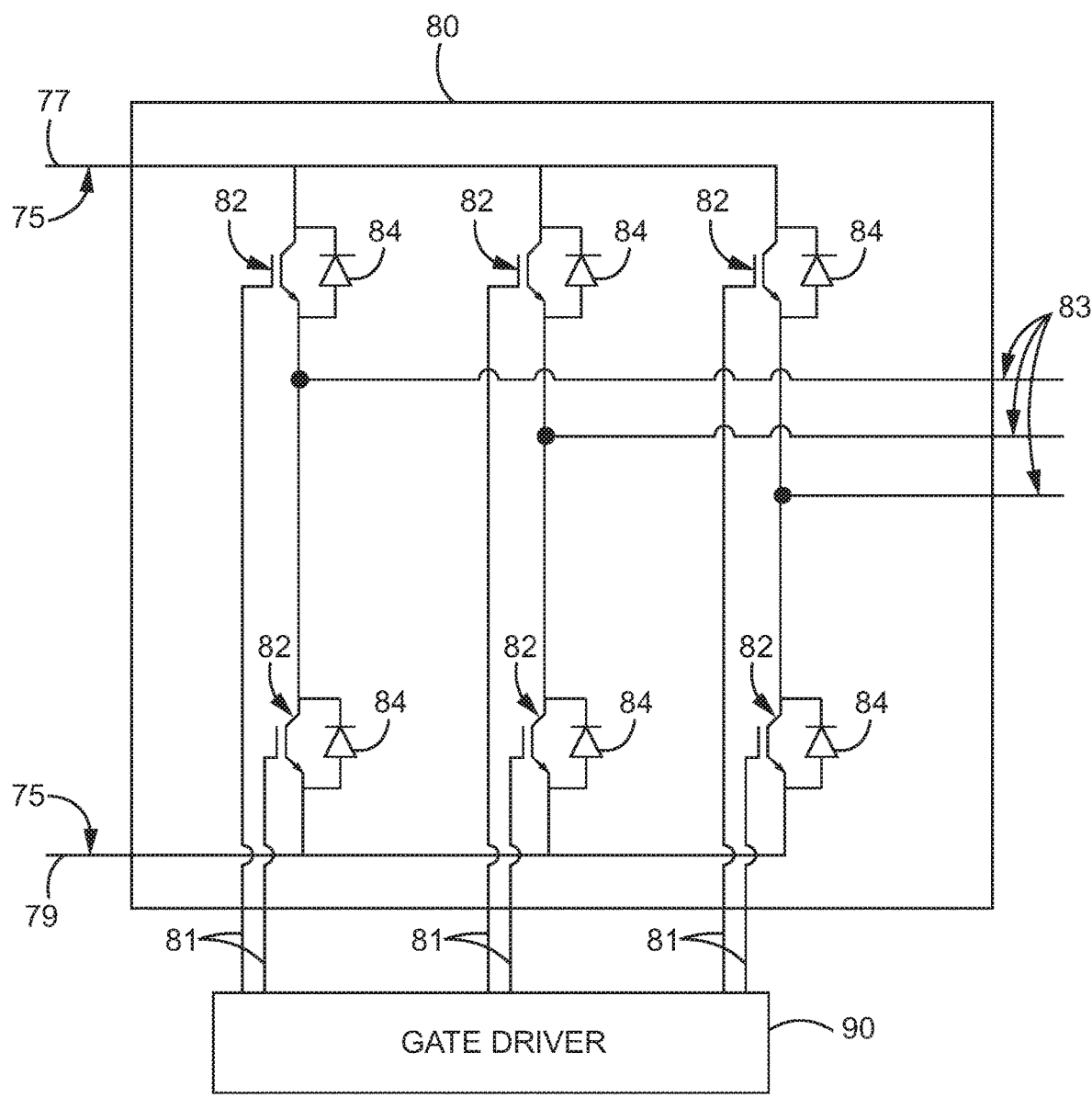
FIG. 5 is a block diagram representation of an inverter section and gate driver module from the motor drive of FIG. 3.

The DC bus 75 is connected in series between the rectifier section 70 and an inverter section 80. Referring also to FIG. 5, the inverter section 80 consists of switching elements, such as transistors, thyristors, or SCRs as is known in the art. The illustrated inverter section 80 includes an insulated gate bipolar transistor (IGBT) 82 and a free-wheeling diode 84 connected in pairs between the positive rail 77 and each phase of the output voltage as well as between the negative rail 79 and each phase of the output voltage. Each of the IGBTs 82 receives gating signals 81 to selectively enable the transistors 82 and to convert the DC voltage from the DC bus 75 into a controlled three phase output voltage to the motor 32. When enabled, each transistor 82 connects the respective rail 77, 79 of the DC bus 75 to an electrical conductor 83 connected between the transistor 82 and the output terminal 35. The electrical conductor 83 is selected according to the application requirements (e.g., the rating of the motor drive 30) and may be, for example, a conductive surface on a circuit board to which the transistors 82 are mounted or a bus bar connected to a terminal from a power module in which the transistors 82 are contained. The output terminals 35 of the motor drive 30 may be connected to the motor 32 via a cable including electrical conductors connected to each of the output terminals 35.

One or more modules are used to control operation of the motor drive 30. According to the embodiment illustrated in FIG. 3, a controller 100 includes the modules and manages execution of the modules. The illustrated embodiment is not intended to be limiting and it is understood that various features of each module discussed below may be executed by another module and/or various combinations of other modules may be included in the controller 100 without deviating from the scope of the invention. The modules may be stored programs executed on one or more processors, logic circuits, or a combination thereof. The controller 100 may be implemented, for example, in a microprocessor, application specific integrated circuit (ASIC), field programmable gate array (FPGA), or other such customizable device. The motor drive 30 also includes a memory device 95 in communication with the controller 100. The memory device 95 may include transitory memory, non-transitory memory or a combination thereof. The memory device 95 may be configured to store data and programs, which include a series of instructions executable by the controller 100. It is contemplated that the memory device 95 may be a single device, multiple devices, or incorporated, for example, as a portion of another device such as an application specific integrated circuit (ASIC). The controller 100 is in communication with the memory 95 to read the instructions and data as required to control operation of the motor drive 30.

The controller 100 receives a reference signal 97 identifying desired operation of the motor 32 connected to the motor drive 30. The reference signal 97 may be, for example, a position reference ($\theta^*$), a speed reference ($\omega^*$), or a torque reference ($T^*$). For a high-performance servo control system, the reference signal 97 is commonly a position reference signal ($\theta^*$).

The controller 100 also receives feedback signals indicating the current operation of the motor drive 30. According to the illustrated embodiment, the controller 100 includes a feedback module 65 that may include, but is not limited to, analog to digital (A/D) converters, buffers, amplifiers, and any other components that would be necessary to convert a feedback signal in a first format to a signal in a second format suitable for use by the controller 100 as would be understood in the art The motor drive 30 may include a voltage sensor 71 and/or a current sensor 73 on the DC bus 75 generating a feedback signal corresponding to the magnitude of voltage and/or current present on the DC bus 75. The motor drive 30 may also include one or more voltage sensors 85 and/or current sensors 87 on the output phase(s) of the inverter section 80 generating a feedback signal corresponding to the magnitude of voltage and/or current present on the electrical conductors 83 between the inverter section 80 and the output 85 of the motor drive. A position feedback device 34 may be connected to the motor 32 and operable to generate a position feedback signal ($\theta$) corresponding to the angular position of the motor 32.

The controller 100 utilizes the feedback signals and the reference signal 97 to control operation of the inverter section 80 to generate an output voltage having a desired magnitude and frequency for the motor 32. The feedback signals are processed by the feedback module 65 and converted, as necessary, to signals for the control module 105. The control module 105 also receives the reference signal 97 and executes responsive to the reference signal 97 and the feedback signals to generate a desired output voltage signal to a gate driver module 90. The gate driver module 90 generates the gating signals 81, for example, by pulse width modulation (PWM) or by other modulation techniques. The gating signals 81 subsequently enable/disable the transistors 82 to provide the desired output voltage to the motor 32, which, in turn, results in the desired operation of the mechanical load 37 coupled to the motor 32.

Figure 6:
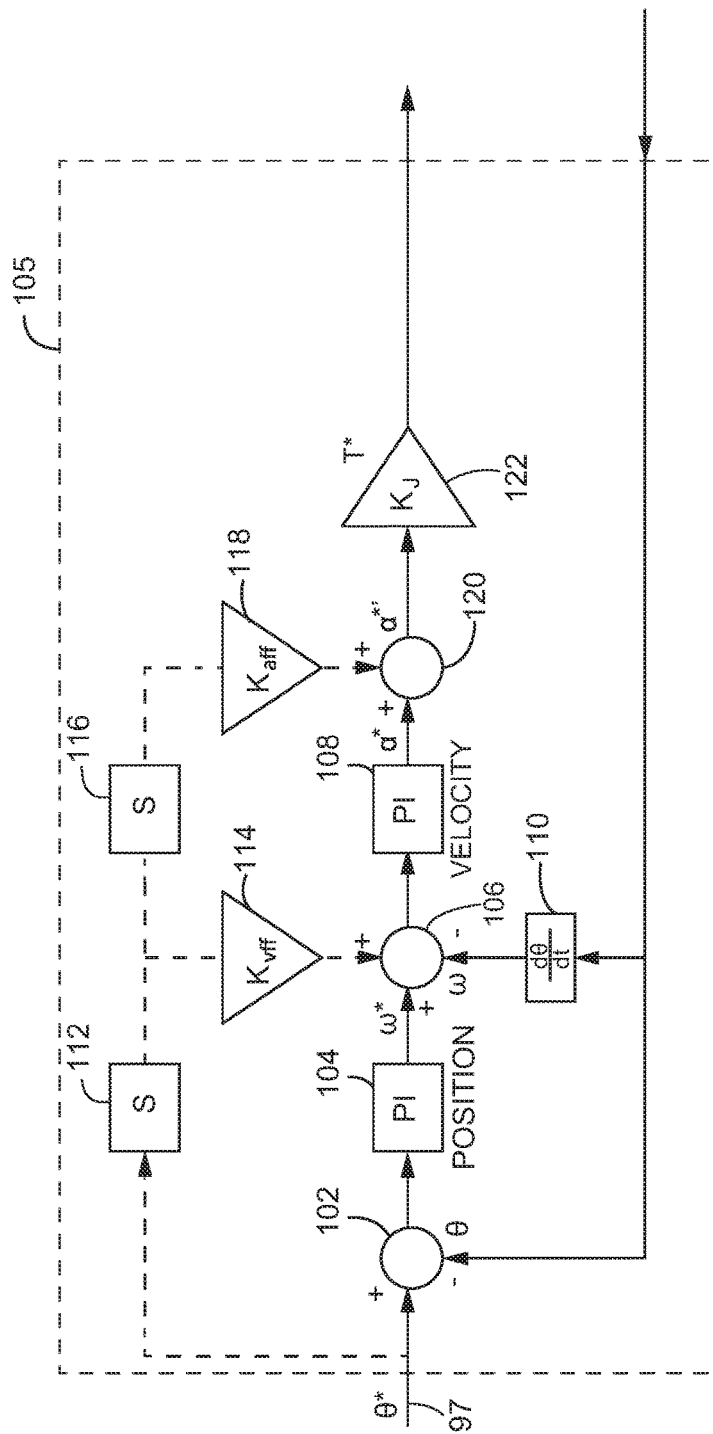
FIG. 6 is a block diagram representation of one embodiment of a control module from the motor drive of FIG. 3.

Referring next to FIG. 6, a control module 105 according to one embodiment of the invention is illustrated. The control module 105 receives a position reference signal ($\theta^*$) 97 as an input. The position reference signal ($\theta^*$) is compared to a position feedback signal ($\theta$) at a first summing junction 102, where the position feedback signal ($\theta$) may be generated by the encoder 34 coupled to the motor 32. A position error signal is output from the first summing junction 102 and input to a position loop controller 104. According to the illustrated embodiment, the position loop controller 104 includes a proportional and an integral (PI) controller. Optionally, the position loop controller 104 may be just a proportional (P) controller or further include a derivative (D) controller. Each of the proportional (P), integral (I), and/or derivative (D) controllers of the position loop controller 104 includes a controller gain value. The position loop controller gain values are commonly referred to as a proportional gain (Kpp), integral gain (Kpi), and a derivative gain (Kpd). The output of the position loop controller 104 is a velocity reference signal ($\omega^*$).

The velocity reference signal ($\omega^*$) is compared to a velocity feedback signal ($\omega$) at a second summing junction 106. The velocity feedback signal ($\omega$) may be determined by the control module by taking the derivative of the position feedback signal ($\theta$) as shown in block 110. A velocity error signal is output from the second summing junction 106 and input to a velocity loop controller 108. According to the illustrated embodiment, the velocity loop controller 108 includes a proportional and an integral (PI) controller. Optionally, the velocity loop controller 108 may be just a proportional (P) controller or further include a derivative (D) controller. Each of the proportional (P), integral (I), and/or derivative (D) controllers of the velocity loop controller 108 includes a controller gain value. The velocity loop controller gain values are commonly referred to as a proportional gain (Kvp), integral gain (Kvi), and a derivative gain (Kvd). The output of the velocity loop controller 108 is an acceleration reference signal ($\alpha^*$).

The control module 105 may also include feed forward branches. According to the illustrated embodiment, the control module 105 includes feed forward branches for both the velocity and the acceleration elements. The position reference signal ($\theta^*$) is passed through a first derivative element 112 to obtain a velocity feed forward signal. The velocity feed forward signal is multiplied by a velocity feed forward gain (Kvff) 114 and combined with the velocity reference signal (($\omega^*$) and the velocity feedback signal ($\omega$) at the second summing junction 106. The velocity feed forward signal is passed through a second derivative element 116 to obtain an acceleration feed forward signal. The acceleration feed forward signal is multiplied by an acceleration feed forward gain (Kaff) 118 and combined with the acceleration reference signal ($\alpha^*$) at a third summing junction 120. The output of the third summing junction 120 is a second acceleration reference ($\alpha^{*'}$).

Although illustrated as an acceleration reference, $\alpha^{*'}$, the output of the third summing junction 120 may be either an acceleration or a torque reference signal. As is understood in the art, angular acceleration is proportional to torque and, more specifically, torque is equal to inertia multiplied by the angular acceleration. In some embodiments of the control module 105, calculations may be performed in a per unit system. Depending on the per unit system, a range of zero to one hundred percent acceleration may be equivalent to a range of zero to one hundred percent torque. As a result, a per unit value of acceleration would be equivalent to a per unit value of torque. In other embodiments, the inertia of the motor or of the motor and load may be incorporated into the controller gains of the velocity loop controller 108 and in the acceleration feedforward path to output a torque reference from the third summing junction 120. In the illustrated embodiment, because the output of the third summing junction 120 is an acceleration reference, an inertia scaling block 122 is provided to convert the acceleration reference to a torque reference. The inertia scaling block 122 applies a gain, $K_J$, corresponding to the inertia of the controlled system. The gain of the inertia scaling block 124 may include the motor inertia value, $J_m$, the load inertia, $J_1$, or a combination thereof. In alternate embodiments where either the units are identical or where the inertia is incorporated into the controller gains, the inertia scaling block 122 may be omitted. The torque reference signal, T*, is then provided to other elements within the controller 100.

With reference again to FIG. 3, the output of the control module 105 is provided as an input to the gate driver module 90. The gate driver module 90 converts the input to a desired output voltage having a variable amplitude and frequency. Having determined the output voltage required to produce the desired input, the gate driver module 90 generates the gating signals 81 used by pulse width modulation (PWM) or by other modulation techniques to control the switching elements in the inverter section 80 to produce the desired output voltage. The gating signals 81 subsequently enable/disable the switching elements 82 to provide the desired output voltage to the motor 32, which, in turn, results in the desired operation of the mechanical load 37 coupled to the motor 32.

As is understood in the art, a complete model of the dynamics for a controlled system is complex, including, for example, motor drive dynamics, dynamics of mechanical coupling, load dynamics, system imbalances and the like. Further, due to the complexity of the controlled system, the models utilized to predict performance of the controlled system are similarly complex and computationally intensive. Accurate simulations often require a dedicated computer with multiple processors, parallel processing capabilities, or other significant dedicated processing and memory resources and may require a significant amount of time to execute. Such processing resources are typically either beyond the ability of an industrial controller 12 and/or a motor drive 30 or would so monopolize the processing resources of the industrial controller 12 and/or the motor drive 30 as to prevent the industrial controller 12 from executing the control program or prevent the motor drive 30 from executing the control modules to achieve desired operation of the motor 32.

The present invention provides a simulation module 130 having a reduced order of complexity such that it may be processed online by the industrial controller 12 or the motor drive 30 without comprising execution of the control program or control modules.

Figure 7:
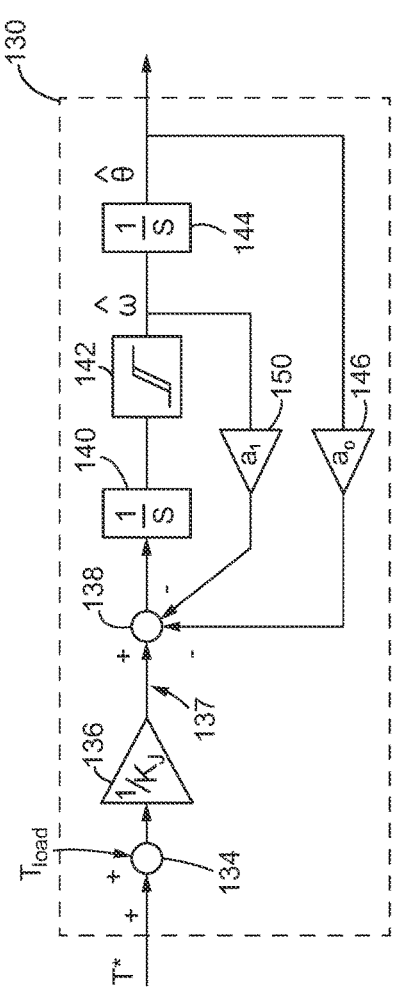
FIG. 7 is a block diagram representation of a simulation module executing in the motor drive of FIG. 3 according to one embodiment of the invention.

Turning next to FIG. 7, one embodiment of the simulation module 130 is illustrated. A summing junction 134 within the simulation module 130 receives the torque reference signal, T*, from the control module 105 and a value of a load torque, $T_{load}$. The load torque, $T_{load}$, may be a value stored in memory 95 in the motor drive 30 or may be an input to the motor drive 30. It is contemplated that the load torque, $T_{load}$, may, for example, correspond to a gravitational load present at the motor. The output of the summing junction 134 is an input to an inertia gain block 136. The inertia gain block 136 applies an inverse gain ($1/K_J$) to the output of the summing junction 134 to convert the torque to an acceleration. The value of the inertial gain, $K_J$, may correspond to the motor inertia value, $J_m$, the load inertia, $J_1$, or a combination thereof.

It is further contemplated that the acceleration reference signal from the control module 105 may be provided as an input to the simulation module 130 and a corresponding value of acceleration required to be applied to a load to compensate for the load may be input to the summing junction 134. If an acceleration reference and a load acceleration are provided as inputs to the summing junction 134, the inertia gain block 136 may be omitted in the simulation module.

The output of the inertia gain block 136 or of the summing junction 134 is provided as an input 137 to the reduced order model of the system. The input 137 is provided to a second summing junction 138 in combination with one or more feedback signals of the reduced order model. According to the illustrated embodiment, the reduced order model includes an estimated velocity and an estimated position feedback path. The output of the second summing junction 138 is an input to an integrator 140, and the output of the integrator 140 is provided to a saturation block 142. Although illustrated as two separate steps, the integrator 140 and the saturation block 142 may be combined as a single, bounded integrator block. The output of the saturation block 142 is an estimated velocity, $\hat{\omega}$, of the motor 32. The estimated velocity, $\hat{\omega}$, of the motor is, in turn, provided as an input to a second integrator 142, and the output of the second integrator provides an estimated position, $\hat{\theta}$, of the motor 32. The estimated velocity, $\hat{\omega}$, of the motor is fed back through a first feedback gain, $a_1$, 150 to the second summing junction 138 and the estimated position, $\hat{\theta}$, of the motor is fed back through a second feedback gain, $a_0$, 146 to the second summing junction 138.

Figure 8:
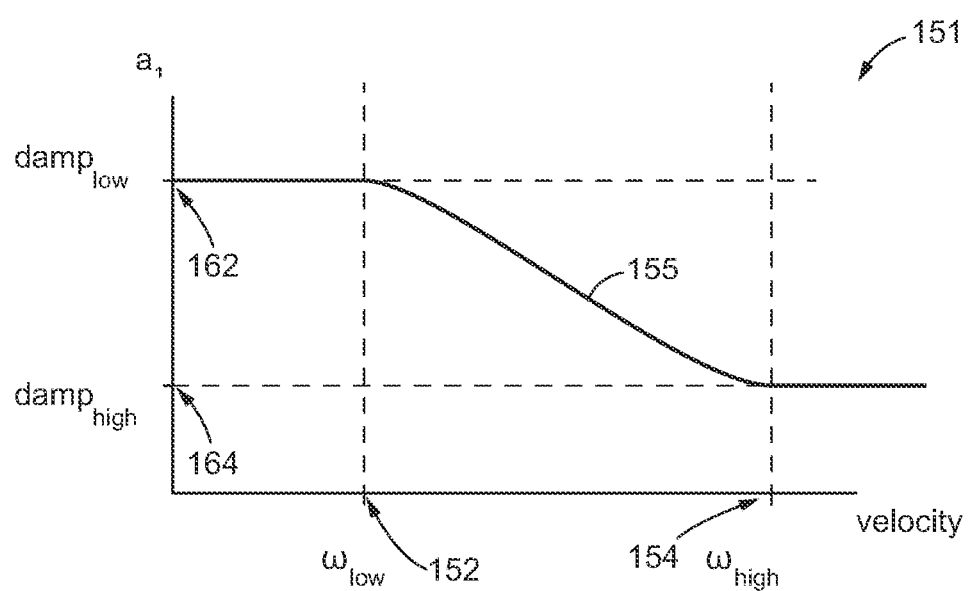
FIG. 8 is a graphical representation of a dynamic controller gain utilized in the simulation module of FIG. 7.

Referring next to FIG. 8, the first feedback gain, at, 150 in the simulation module 130 is a dynamic gain. The graph 151 of FIG. 8 includes a plot 155 of the magnitude of the first feedback gain, at, 150 with respect to the velocity of the motor. The magnitude of the gain, at, varies as a function of the speed at which the motor is operating. As will be discussed in more detail below, it is contemplated that the simulation module 130 may execute with the hardware either included in the loop, with software in the loop, or with varying degrees of hardware and software included in the loop.

In a first embodiment, it is contemplated that the hardware is in the loop. A motor drive 30 is operatively connected to the industrial controller 12 and a motor 32 and position feedback device 34 are operatively connected to the motor drive 30. A control program executing on the industrial controller 12 generates a command signal for the motor drive and the motor 32 and position feedback device 34 are connected to and being controlled by the motor drive 30 according to the generated command signal. The simulation module 130 may be executed in the motor drive 30 and the estimated velocity, $\hat{\omega}$, or the estimated position, $\hat{\theta}$, may be utilized to adjust the configuration and improve performance of the motor drive 30 prior to connecting the motor 32 to the load 37. The value of the first feedback gain, $a_1$, 150 may be selected as a function of either a velocity feedback signal, determined as a function of the position feedback signal (θ) from the position feedback device 34, or the estimated velocity, $\hat{\omega}$, determined by the simulation module 130.

In another embodiment, it is contemplated that the industrial controller 12 is operating with only software in the loop. A copy of the control module 105, corresponding to a motor drive 30 that will be connected to the industrial controller 12, may be included in the industrial controller 12. The industrial controller 12 executes the control program to generate the command signal that would be transmitted to the motor drive. The copy of the control module 105 receives the command signal and the industrial controller 12 executes the copy of the control module 105 and the simulation module 130. The estimated position, $\hat{\theta}$, from the simulation module 130 is utilized as a position feedback signal to the control module 105. The value of the first feedback gain, $a_1$, 150 may be selected as a function of the estimated velocity, $\hat{\omega}$, determined by the simulation module 130.

In still other embodiments, it is contemplated that portions of the hardware may be included in the loop and portions of the control loop may be implemented in software. For example, the motor drive 30 may be connected to the industrial controller 12 and be operative to execute the control module 105 and the simulation module 130. However, the motor 32 and position encoder 34 may be disconnected from the motor drive 30. The estimated position, $\hat{\theta}$, from the simulation module 130 may be utilized as a position feedback signal to the control module 105. When the motor drive 30 is connected to the industrial controller, but the motor 32 and the position encoder 34 are disconnected from the motor drive 30, it is also contemplated that the processor module 22 may execute the copy of the control module 105 and the simulation module 130. In either instance, the estimated velocity, $\hat{\omega}$, or the estimated position, $\hat{\theta}$, may be utilized to adjust the configuration and improve performance of the motor drive 30 prior to connecting the motor 32 and encoder 34 to the motor drive.

As described above, it is contemplated that either a velocity feedback signal, determined as a function of the position feedback signal ($\theta$) from the position feedback device 34, or the estimated velocity, $\hat{\omega}$, may be utilized to determine the velocity of the motor 32 and the appropriate location along the horizontal axis of the graph 151 of FIG. 8 from which to determine the magnitude of the first feedback gain, $a_1$. At a first speed, $\hat{\omega}_{low}$, the magnitude of the first feedback gain, $a_1$, is set to a first value, $damp_{low}$, and at a second speed, $\omega_{high}$, the magnitude of the first feedback gain, $a_1$, is set to a second value, $damp_{high}$. The setpoints may be stored in memory 95 of the motor drive 30 and/or in memory 50 of the processor module 22. Optionally, multiple values of the first feedback gain for varying speeds between the setpoints may also be stored in memory 95 and the motor drive may further be configured to interpolate between two stored values to obtain a desired value of the first feedback gain, $a_1$, that corresponds to the velocity of the motor.

Determination of the gain values may be done as a determination of first principles, via parameter identification techniques, or via characterization techniques. First principles, for example, recognize that a load typically has higher static friction forces than moving friction forces. In other words, at lower speeds a load is more likely to come to a stop and requires a greater force to keep the load in motion, therefore, having higher damping properties. At higher speeds a load is more likely to remain in motion and requires a lesser force to keep the load in motion. Consequently, the magnitude of the first feedback gain, $a_1$, used by the simulation module 130 is greater at lower speeds of the motor and lower at higher speeds of the motor.

Alternately, characterization techniques may be utilized to determine values for the magnitude of the first feedback gain, $a_1$. A test motor, for example, may be connected to a motor drive and industrial controller and operated under a number of different operating conditions during a characterization process. Performance of the test motor may be observed during the characterization process, for example, to monitor a force required to maintain a constant speed of the motor. If for example, the force is less at higher speed than at lower speed, a similar plot to that shown in FIG. 8 and discussed above with respect to first principles results. A number of motors, motor drives, and combinations thereof may be characterized and a table of values for the first feedback gain, $a_1$, may be generated. The table may be stored in memory of the processor module 22 and/or the motor drive 30 for subsequent use during execution of the simulation module 130.

Figure 9:
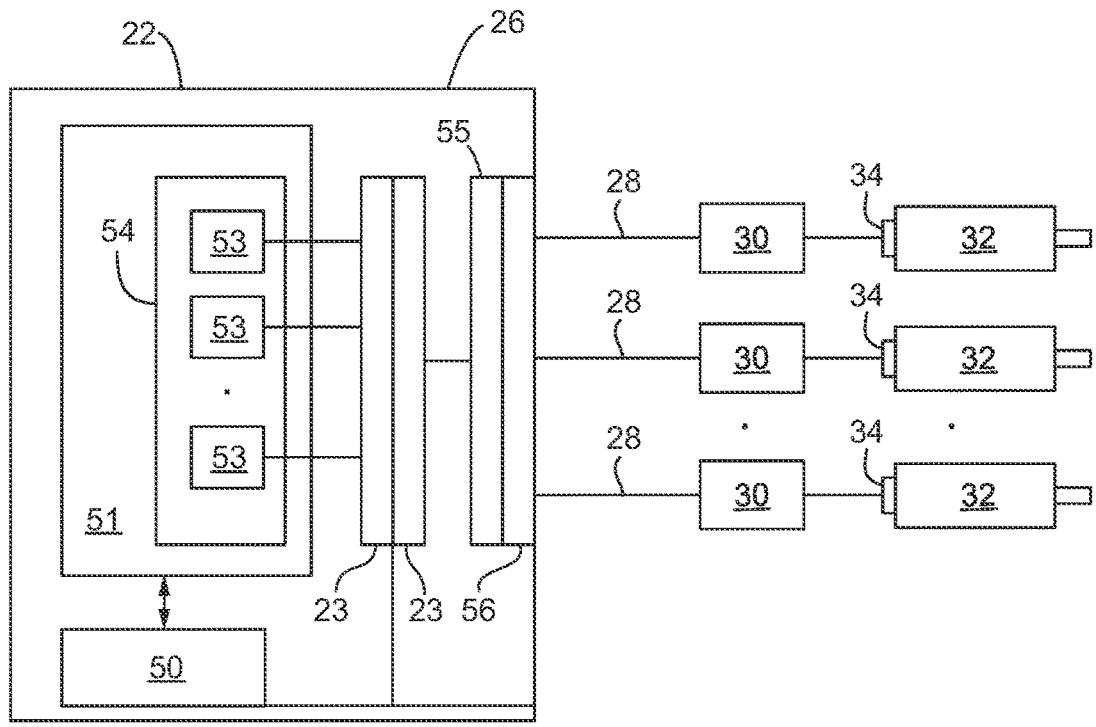
FIG. 9 is a block diagram representation of multiple axis controllers generating reference signals for multiple motor drives according to one embodiment of the invention.
Figure 10:
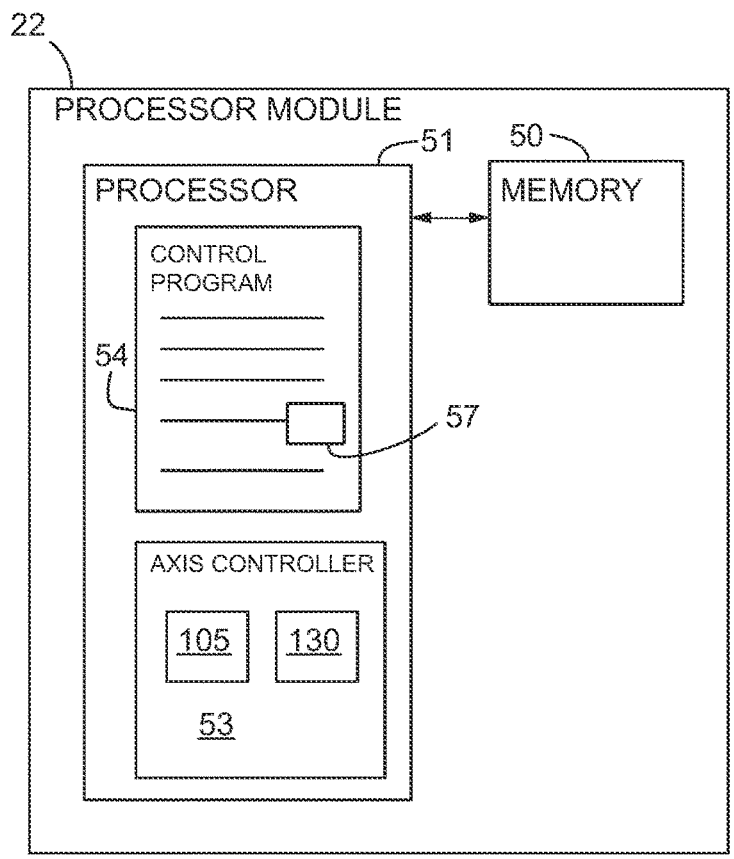
FIG. 10 is a block diagram representation of a processor module executing a simulation of an axis with software in the loop according to one embodiment of the invention.

With reference next to FIGS. 9 and 10, the industrial controller may include a plurality of axis controllers 53 which generate the reference signal 97 for a motor drive 30 connected to the axis controller. According to the embodiment shown in FIG. 9, each axis controller 53 is a segment of the control program 54 executing in the processor module 22. Optionally, each axis controller 53 may be a module or program executed by the processor 51 separately from the control program 54 as illustrated in FIG. 10. The axis controller 53 may be instructed, for example, according to a control program instruction 57 to jog, move to a position, move for a duration, or the like. The axis controller 53, in turn, generates an appropriate reference signal 97 such as a commanded velocity, commanded position, or commanded torque at with the motor 32 connected to the motor drive 30 will need to operate in order to achieve the instruction from the control program 54. According to other embodiments, a central motion planner may receive each of the motion instructions and generate a reference signal for the axis identified in the motion instruction. The central motion planner may also receive an initial position command for the controlled machine or process that requires multiple axes of motion to accomplish. The central motion planner may execute initial processing of the command and transmit commands to each axis controller 53 to achieve the initial position command. The central motion planner may similarly be a segment of the control program 54. Optionally, each axis controller 53 and/or a central motion planner may be implemented as one or modules 18 that may be inserted in the industrial controller 12.

In a first embodiment of the invention, the motor drive 30 is able to execute the simulation module 130 online in tandem with controlling operation of a motor 32 connected to the motor drive. As discussed above, precise models of complex dynamic systems require significant processing resources. In a motor drive 30, the frequency at which the control module is executed is typically selected to utilize a significant portion of the processing capability. It is understood that faster control loops can make smaller adjustments to the output and still maintain the desired operating point. Further, precise control often requires additional elements in a control loop such as feedforward control paths; proportional, integral, and derivative paths in the control loops; filters; and the like. As a result of additional elements in the control loop, the computational requirements of the control module 105 increase. Increases in the computational requirements of the control module 105 along with increases in the frequency at which the control module 105 is executed limits the resources for additional processing within the motor drive 30.

The reduced order simulation module 130, as discussed above, limits the computational requirements of the simulation module 130. The simulation module 130 includes the relative inertia of the load and a load torque, when necessary, for example, to simulate a gravitational load applied to the motor 32. The simulation module 130 also includes a portion of the dominant elements of the motor drive dynamics represented, for example, by the two integrators and the feedback gains.

Additionally, it is contemplated that the simulation module 130 is executed at a frequency less than the frequency at which the control module 105 is executed to further reduce the computational requirements of the simulation module 130. According to one embodiment of the invention, the control module 105 may be executed at an eight kilohertz (8 kHz) update rate, or at a periodic interval of 0.125 milliseconds. The simulation module 130 may be executed at a one kilohertz (1 kHz) update rate, or at a periodic interval of one millisecond. It is contemplated that various other update rates may be utilized. However, the reduced update rate as well as the reduced order of the simulation module reduce the computational requirements of the simulation module allowing it to be executed in tandem with the control module 105 during operation of the motor drive 30.

It is contemplated that the motor drive 30 may execute the simulation module 130 either with or without the motor 32 and encoder 34 connected to the motor drive and, if the motor 32 is connected to the motor drive 30, the motor drive 30 may execute the simulation module 130 with or without the load connected to the motor 32. In certain applications, for example, the motor drive 30 may be connected to the industrial controller 12 and a motor 32 and an encoder 34 may be connected to the motor drive 30; however, the load controlled by the motor 32 may be either disconnected or not yet present for connection to the motor 32. To facilitate commissioning of the motor drive 30 and/or validation of a control program 54 executing in the processor module 22, the simulation module 130 may be utilized to predict operation of the mechanical system to be connected to the motor. In other applications, the motor 32 and encoder 34 may either be disconnected or not yet present for connection to the motor drive 30. The motor drive 30 may be configured to execute the control module 105 and the simulation module 130 without the motor 32 or encoder 34 connected to the motor drive 30. In such applications, the motor drive 30 utilizes the estimated velocity, $\hat{\omega}$, or the estimated position, $\hat{\theta}$, generated by simulation module 130 rather than a feedback signal from the encoder 34. Consequently, the control program 54 in the processor module 22 may execute control instructions that require execution of the motor drive 30 either prior to the motor 32 being connected or without the motor running to test operation of the control program 54. Further, initial tuning of the motor drive 30 may be performed as a function of the estimated velocity, $\hat{\omega}$, or the estimated position, $\hat{\theta}$, generated by simulation module 130 to speed up commissioning of the controlled machine or process 36 and validation of the control program 54.

In another embodiment of the invention, the processor module 22 may be configured to execute the simulation module 130 and a copy of the control module 105 when the motor drive 30 is either disconnected or not yet present for connection to the industrial controller 12. According to the embodiment illustrated in FIG. 10, an axis controller 53 is configured to execute the copy of the control module 105 and the simulation module 130. A separate axis controller 53 may be defined for each axis of motion. Optionally, a central motion planner may execute one or more instances of the control module 105 and simulation module 130 where each instance corresponds to a separate axis of motion.

The processor module 22 is able to execute each axis controller 53 in tandem with the control program 54 executing on the processor 51. As discussed above, precise models of complex dynamic systems require significant processing resources. The reduced order simulation module 130, as discussed above, limits the computational requirements of the simulation module 130. Further, it is contemplated that the simulation module 130 may be executed at a frequency less than the frequency at which the control program 54 is executed. With the axis controller 53 executing as a separate module from the control program 54, a motion instruction 57 in the control program may indicate desired motion of a motor 32. The axis controller 53 receives the desired motion command and generates a reference signal 97 that may be input to the copy of the control module 105. The axis controller 53 may execute the copy of the control module 105 and the simulation module 130 at an update rate that is less than the update rate of the control program 54. It is contemplated that the update rate for execution of the axis controller 53 may be configurable and set, for example, as one of the parameters of the motion instruction 57. The reduced update rate as well as the reduced order of the simulation module reduce the computational requirements of the simulation module allow the processor module 22 to execute the control program 54 in tandem with the copy of the control module 105 and the simulation module 130.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for simulating an axis of motion in an industrial controller, the method comprising the steps of:
generating a first reference signal corresponding to a desired operation of the axis of motion with an axis controller;
transmitting the first reference signal from the axis controller to a control module, wherein the control module corresponds to a motor drive and receives the first reference signal as an input;
generating a second reference signal with the control module as an output from at least one control loop, wherein the second reference signal is either an acceleration reference or a torque reference corresponding to the desired operation of the axis of motion;
receiving the second reference signal as an input to a simulation module; and
determining at least one of an estimated velocity and an estimated position of a motor to be controlled by the motor drive as a function of the second reference signal with the simulation module, wherein the simulation module includes a dynamic gain which varies as a function of the estimated velocity of the motor.

2. The method of claim 1 wherein the control module is operative to receive a position feedback signal as a second input and the control module generates the second reference signal as a function of the position feedback signal.

3. The method of claim 2 wherein the simulation module determines the estimated position of the motor and the position feedback signal is the estimated position.

4. The method of claim 2 wherein the position feedback signal is generated by an encoder operatively connected to the motor.

5. The method of claim 1 wherein the industrial controller includes a processor module operative to execute a control program, the control module, and the simulation module.

6. The method of claim 1 wherein:
the industrial controller includes a processor module operative to execute a control program,
a motor drive is operatively connected to the industrial controller, and
the motor drive is operative to execute the control module and the simulation module.

7. The method of claim 6 wherein the motor drive executes the control loop to generate the second reference signal at a first periodic interval, the motor drive executes the simulation module at a second periodic interval, and the second periodic interval is longer than the first periodic interval.

8. A system for simulating an axis of motion in an industrial controller, the system comprising:
- a processor module operative to execute a control program to control operation of a controlled machine or process;
- an axis controller operative to generate a first reference signal corresponding to a desired operation of the axis of motion; and
- a control module in communication with the axis controller, wherein the control module corresponds to a motor drive and is operative to receive the first reference signal from the axis controller and generate a second reference signal as a function of the first reference signal, wherein the second reference signal is either an acceleration reference or a torque reference corresponding to the desired operation of the axis of motion; and
- a simulation module operative to determine at least one of an estimated velocity and an estimated position of a motor to be controlled by the motor drive as a function of the second reference signal, wherein the simulation module includes a dynamic gain which varies as a function of the estimated velocity of the motor.

9. The system of claim 8 wherein the control module is operative to receive a position feedback signal as an input and the control module generates the second reference signal as a function of the position feedback signal.

10. The system of claim 9 wherein the simulation module determines the estimated position and the position feedback signal is the estimated position.

11. The system of claim 8 wherein the processor module is further operative to execute the axis controller, the control module, and the simulation module.

12. The system of claim 8 further comprising a motor drive operatively connected to the processor module, wherein the processor module is operative to execute the axis controller and the motor drive is operative to execute the control module and the simulation module.

13. The system of claim 12 wherein the motor drive executes the control module at a first periodic interval, the motor drive executes the simulation module at a second periodic interval, and the second periodic interval is longer than the first periodic interval.

14. A method for simulating an axis of motion in an industrial controller, the method comprising the steps of:
- generating a first reference signal corresponding to a desired operation of the axis of motion with an axis controller;
- transmitting the first reference signal from the axis controller to a control module wherein the control module corresponds to a motor drive and receives the first reference signal as an input;
- generating a second reference signal with the control module as an output from at least one control loop, wherein the second reference signal is either an acceleration reference or a torque reference corresponding to the desired operation of the axis of motion;
- receiving the second reference signal as an input to a simulation module; and
- determining at least one of an estimated velocity and an estimated position of a motor controlled by the motor drive as a function of the second reference signal with the simulation module, wherein the first reference signal is generated at a first periodic interval, the second reference signal is generated at a second periodic interval, and the second periodic interval is longer than the first periodic interval.

15. The method of claim 14 wherein the simulation module includes a dynamic gain which varies as a function of the estimated velocity of the motor.

16. The method of claim 14 wherein the control module is operative to receive a position feedback signal as an input and the control module generates the second reference signal as a function of the position feedback signal.

17. The method of claim 16 wherein the simulation module determines the estimated position of the motor and the position feedback signal is the estimated position.

18. The method of claim 16 wherein the position feedback signal is generated by an encoder operatively connected to the motor.

19. The method of claim 14 wherein the industrial controller includes a processor module operative to execute a control program, the control module, and the simulation module.

20. The method of claim 14 wherein:
- the industrial controller includes a processor module operative to execute a control program,
- a motor drive is operatively connected to the industrial controller, and
- the motor drive is operative to execute the control module and the simulation module.

* * * * *